(12) United States Patent
Leonhardt et al.

(10) Patent No.: US 11,671,048 B2
(45) Date of Patent: Jun. 6, 2023

(54) MULTIPHASE VOLTAGE TRANSFORMER FOR A SUPPLY NETWORK AND METHOD FOR POWERING DOWN AN INTERMEDIATE CIRCUIT VOLTAGE OF THIS SUPPLY NETWORK

(71) Applicant: Schaeffler Technologies AG & Co. KG, Herzogenaurach (DE)

(72) Inventors: Vincent Leonhardt, Haguenau (FR); Jürgen Tipper, Gernsbach (DE); Huan Fu, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 87 days.

(21) Appl. No.: 17/609,478

(22) PCT Filed: Apr. 15, 2020

(86) PCT No.: PCT/DE2020/100300
§ 371 (c)(1),
(2) Date: Nov. 8, 2021

(87) PCT Pub. No.: WO2020/224700
PCT Pub. Date: Nov. 12, 2020

(65) Prior Publication Data
US 2022/0255485 A1 Aug. 11, 2022

(30) Foreign Application Priority Data

May 7, 2019 (DE) .......................... 102019111838.7
May 14, 2019 (DE) .......................... 102019112522.7

(51) Int. Cl.
*H02P 27/08* (2006.01)
*B60L 3/00* (2019.01)
*B60L 3/04* (2006.01)

(52) U.S. Cl.
CPC .............. *H02P 27/08* (2013.01); *B60L 3/003* (2013.01); *B60L 3/0046* (2013.01); *B60L 3/04* (2013.01)

(58) Field of Classification Search
CPC ......... H02P 2201/032; H02P 2201/053; H02P 2201/07; H02P 2201/09; H02P 2201/11;
(Continued)

(56) References Cited

U.S. PATENT DOCUMENTS

2019/0109529 A1* 4/2019 Nobe ..................... G01R 31/40

FOREIGN PATENT DOCUMENTS

EP 2567857 3/2013
EP 2860060 4/2015

* cited by examiner

*Primary Examiner* — Antony M Paul
(74) *Attorney, Agent, or Firm* — Volpe Koenig

(57) ABSTRACT

A multiphase voltage transformer for an electrical supply network for supplying an electrical machine with electrical energy from an electrical energy storage system. This electrical supply network includes the multiphase voltage transformer, an output current converter connected downstream of this transformer and an intermediate circuit connected between the transformer and the output current converter. The transformer includes a circuit arrangement having parallel-connected voltage transformer units at the input end, each of these units having an inductance and two semiconductor switch units and a control unit for actuating the semiconductor switch units. The control unit is configured so as to actuate the semiconductor switch units in an intermediate circuit discharging operation such that it powers down the intermediate circuit voltage of the intermediate circuit in less than a second into the low voltage range. A corresponding electrical supply network, an energy supply system having network and a method are provided.

17 Claims, 5 Drawing Sheets

(58) Field of Classification Search
CPC .... H02P 2207/076; H02P 27/00; H02P 27/04; H02P 27/06; H02P 27/08; H02P 29/00; H02P 29/02; H02P 29/032; H02P 25/00; H02P 25/092; H02P 25/0925; H02P 25/10; H02P 25/107; H02P 25/03; H02P 25/062; H02P 25/064; H02P 21/00; H02P 21/20; H02P 21/22; H02P 23/00; H02P 21/14

See application file for complete search history.

US 11,671,048 B2

MULTIPHASE VOLTAGE TRANSFORMER FOR A SUPPLY NETWORK AND METHOD FOR POWERING DOWN AN INTERMEDIATE CIRCUIT VOLTAGE OF THIS SUPPLY NETWORK

CROSS-REFERENCE TO RELATED APPLICATIONS

This application is the U.S. National Phase of PCT Appln. No. PCT/DE2020/100300, filed Apr. 15, 2020, which claims priority from German Patent Application No. 10 2019 111 838.7, filed May 7, 2019, and German Patent Application No. 10 2019 112 522.7, filed May 14, 2019, the entire disclosures of which are incorporated by reference herein.

TECHNICAL FIELD

The disclosure relates to a multiphase voltage transformer for an electrical supply network for supplying an electrical machine with electrical energy from an electrical energy storage system, wherein this electrical supply network comprises the multiphase voltage transformer, an output current converter connected downstream of this voltage transformer and an intermediate circuit connected between the voltage transformer and output current converter, and wherein the multiphase voltage transformer itself comprises (i) a circuit arrangement having a plurality of parallel-connected voltage transformer units at the input end, each having an inductance and two semiconductor switch units as well as (ii) a control unit for actuating the semiconductor switch units.

The disclosure further relates to a corresponding electrical supply network for supplying an electrical machine and an energy supply system with such an electrical supply network. Finally, the disclosure also relates to a method for powering down an intermediate circuit voltage of a corresponding electrical supply network.

BACKGROUND

The document EP 2 567 857 A1 discloses an electrical supply network for supplying an electrical three-phase traction machine of a vehicle with electrical energy from an electrical energy storage system, wherein this electrical supply network has a six-phase voltage transformer, an inverter connected downstream of this voltage transformer as an output current converter and an intermediate circuit between the six-phase voltage transformer and the inverter. The six-phase voltage transformer itself comprises a circuit arrangement with six voltage transformer units, each having an inductance and two semiconductor switch units, which can be switched or connected in parallel via a switching mechanism, and a control unit for actuating the semiconductor switch units.

According to the relevant safety standards, the electrical energy in an intermediate DC circuit of an electrical supply network for supplying an electrical machine of a vehicle, which has a voltage greater than 60 V DC (DC: abbreviation for direct current), i.e., what is termed high-voltage vehicle power electronics, must be able to be discharged to a level lower than 60 V DC that is harmless to humans in under 2 s. In current applications, depending on the voltage range of the battery voltage, this includes discharge voltages from 500 V to 800 V DC. Such a discharge usually takes place via an active discharge circuit, which requires additional components and thus additional installation space and costs. At least one additional power semiconductor switch and additional power resistors are required to convert the stored energy into heat, as well as a logic controller for this circuit.

In battery-operated electrical vehicle drive systems, voltage transformers (also referred to as DC/DC converters) are connected upstream of the drive converter to increase the efficiency. These voltage transformers generally have the task of tracking the intermediate DC circuit voltage of the drive inverter depending on the operating point of the drive system. For reasons of space and cost, the DC/DC converters—as in the example mentioned—are often multiphase. Furthermore, multiphase DC/DC converter units are generally used for fuel cell-operated vehicles in order to set the cell voltage to a high-voltage level.

SUMMARY

The object of the disclosure is to specify measures by which the active discharging of the intermediate circuit can be implemented with reduced effort.

The object is achieved according to the disclosure by the use of one or more of the features disclosed herein. Preferred designs of the disclosure are specified below and in the claims, each of which either individually or in combination can represent an aspect of the disclosure.

With the multiphase voltage transformer according to the disclosure for an electrical supply network for supplying an electrical machine with electrical energy from an electrical energy storage system (such as a battery system), wherein this electrical supply network comprises the multiphase voltage transformer, an output current converter connected downstream of this voltage transformer and an intermediate circuit connected between the voltage transformer and output current converter and wherein the multiphase voltage transformer itself comprises (i) a circuit arrangement having a plurality of parallel-connected voltage transformer units at the input end, each having an inductance and two semiconductor switch units, as well as (ii) a control unit for actuating the semiconductor switch units, it is provided that the control unit is configured so as to actuate the semiconductor switch units in an intermediate circuit discharging operation in such a way that the intermediate circuit voltage of the intermediate circuit is powered down into a voltage range lower than 60 V DC in less than two seconds. No additional components, i.e., additional electrical components, are required for powering down the intermediate circuit voltage. Only the existing semiconductor switch units, the control unit for actuating them and the ever-present internal resistors of the circuit are used.

According to a preferred embodiment, the control unit is configured to actuate the semiconductor switch units in the intermediate circuit discharging operation in such a way that:

first, in an optional first step, an input capacitor at the input of the voltage transformer is discharged via at least one of the inductances, then in a second step, the energy stored in the intermediate circuit is distributed to the inductances and finally in a third step, the energy stored in the inductances is dissipated via internal resistors of the circuit arrangement.

It is advantageously provided that the multiphase voltage transformer is a two-phase voltage transformer, the circuit arrangement of which has two voltage transformer units. A two-phase voltage transformer has a relatively simple structure.

According to a further preferred embodiment, the voltage transformer units are parallel-connected at the input end via their respective inductance, wherein each voltage transformer unit is connected to a voltage potential of the intermediate circuit via the respective first semiconductor switch unit and is connected to a base potential of the intermediate circuit via the respective second semiconductor switch unit, wherein the voltage potential of the intermediate circuit voltage is defined in relation to the base potential. Such converter units are also referred to as boost converters or step-up converters.

According to yet another preferred embodiment, the following steps result in the intermediate circuit discharging operation:

In an optional step 1: Closing the second semiconductor switch unit of the second voltage transformer unit when the semiconductor switch units of the first voltage transformer unit are open in order to discharge the input capacitor via the inductance of the second voltage transformer units.

In step 2: the subsequent clocked switching on and off of the first semiconductor switch unit of the first voltage transformer unit with the second semiconductor switch unit of the second voltage transformer unit still closed in order to distribute the energy stored in the intermediate circuit to the inductances.

And finally in step 3: Opening both semiconductor switch units of the first voltage transformer unit with the second semiconductor switch unit of the second voltage transformer unit still closed to dissipate the energy stored in the inductances via internal resistors of the circuit arrangement.

In the electrical supply network according to the disclosure for supplying an electrical machine with electrical energy from an electrical energy storage system, wherein this electrical supply network comprises a multiphase voltage transformer, an output current converter connected downstream of this voltage transformer and an intermediate circuit connected between the voltage transformer and output current converter, it is provided that the multiphase voltage transformer is designed as the aforementioned voltage transformer.

In particular, it is provided that the output current converter is designed as an inverter.

In the energy supply system according to the disclosure comprising an electrical machine, an electrical energy storage system and an electrical supply network connected between the electrical machine and the electrical energy storage system, it is provided that this supply network is designed as the aforementioned supply network.

In the method according to the disclosure for powering down an intermediate circuit voltage of an electrical supply network for supplying an electrical machine, comprising a multiphase voltage transformer, an output current converter connected downstream of this voltage transformer and an intermediate circuit connected between the multiphase voltage transformer and output current converter, wherein the multiphase voltage transformer itself comprises a circuit arrangement having a plurality of parallel-connected voltage transformer units at the input end, each having an inductance and two semiconductor switch units, as well as a control unit for actuating the semiconductor switch units, it is provided that the control unit actuates the semiconductor switch units in an intermediate circuit discharging operation in such a way that the intermediate circuit voltage of the intermediate circuit is powered down into a voltage range lower than 60 V DC in less than two seconds. The method is carried out in particular by means of the aforementioned multiphase voltage transformer.

According to a preferred embodiment of the method, it is provided that the control unit actuates the semiconductor switch units in the intermediate circuit discharging operation in such a way that;

first—in an optional step 1—an input capacitor at the input of the voltage transformer is discharged via at least one of the inductances, then in step 2, the energy stored in the intermediate circuit is distributed to the inductances and finally in step 3, the energy stored in the inductances is dissipated via internal resistors of the circuit arrangement.

The disclosure further relates to a computer program product comprising program parts which are loaded in a processor of a control unit of a multiphase voltage transformer and configured to carry out the aforementioned method.

BRIEF DESCRIPTION OF THE DRAWINGS

In the following, the disclosure is explained by way of example with reference to the attached drawings using a preferred exemplary embodiment, wherein the features shown below can represent an aspect of the disclosure both individually and in combination. In the figures.

DETAILED DESCRIPTION

Figure 1:
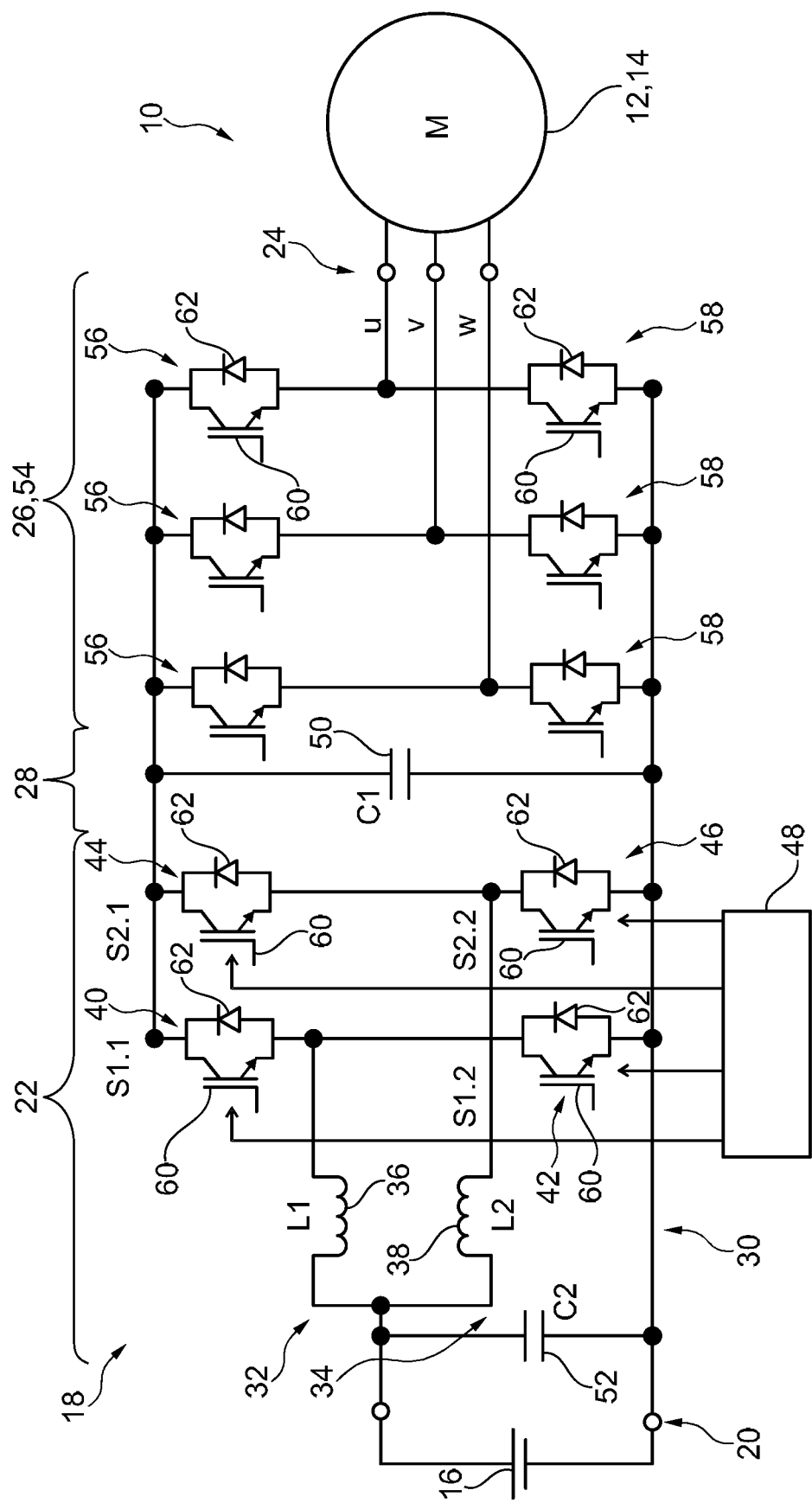
FIG. 1: shows an energy supply system with an electrical machine, an electrical energy storage system and an electrical supply network connected between the electrical machine and electrical energy storage system according to a preferred embodiment of the disclosure.

FIG. 1 shows an energy supply system 10 with an electrical machine 12 designed as a motor M, which is designed as an electrical traction machine 14 of a vehicle, an electrical energy storage system 16 and an electrical supply network 18 connected between the electrical machine 12 and the electrical energy storage system 16. The electrical supply network 18 has a multiphase voltage transformer 22 (multiphase DC/DC converter) at its input 20, an output current converter 26 connected downstream of the multiphase voltage transformer 22 at its output 24 and an intermediate circuit 28 connected between the voltage transformer 22 and the output current converter 26. The multiphase voltage transformer 22 itself has a circuit arrangement 30 with a plurality of (here in the example of FIG. 1, two) parallel-connected voltage transformer units 32, 34, each having an inductance 36, 38 and two semiconductor switch units 40, 42; 44, 46 and a control unit 48 for actuating the semiconductor switch units 40, 42; 44, 46. The intermediate circuit 28 comprises a capacitor 50 of the intermediate circuit 28, shown as an intermediate circuit capacitor C1, which forms a type of output capacitor for the voltage transformer 22 or its voltage transformer units 32, 34. At the input 20 of the electrical supply network 18 or the multiphase voltage transformer 22, an input capacitor 52 is formed, which is also shown as a capacitor C2.

The multiphase voltage transformer 22 shown here in the example of FIG. 1 is a two-phase voltage transformer with two voltage transformer units 32, 34, the inductances 36, 38 (1, L2) of which are connected in parallel at the positive potential of the input 20. The first voltage transformer unit 32 has the inductance 36 (L1) as well as the first semiconductor switch unit 40 connected as a high-side unit (S1.1) and the second semiconductor switch unit 42 connected as a low-side unit (S1.2). The second voltage transformer unit 34 has the inductance 38 (L2) as well as the first semiconductor switch unit 44 connected as a high-side unit (S2.1) and the second semiconductor switch unit 46 connected as a low-side unit (S2.2). In other words, the two voltage transformer units 32, 34 are connected in parallel at the input end via their inductance 36, 38. Each of the two voltage transformer units 32, 34 is connected to a voltage potential (the high-side) of the intermediate circuit 28 via its respective first semiconductor switch unit 40, 44 and to a base potential of the intermediate circuit 28 (the low-side) via its respective second semiconductor switch unit 42, 46, wherein the voltage potential of the intermediate circuit voltage is defined in relation to the base potential.

The electrical machine 12 is an AC machine, more precisely a three-phase machine, which is used as a traction motor M of a motor vehicle. Here, the output current converter 26 is accordingly an inverter 54. As is usually the case, this has two semiconductor switch units 56, 58 per phase U, V, W of the electrical machine 12. The example shown here includes each of the semiconductor switch units 40, 42; 44, 46 of the multiphase voltage transformer 22 as well as each of the semiconductor switch units 56, 58 of the inverter 26 made up of semiconductor components in the form of a power transistor 60 and a power diode 62 connected in parallel, more precisely anti-parallel.

Figure 2:
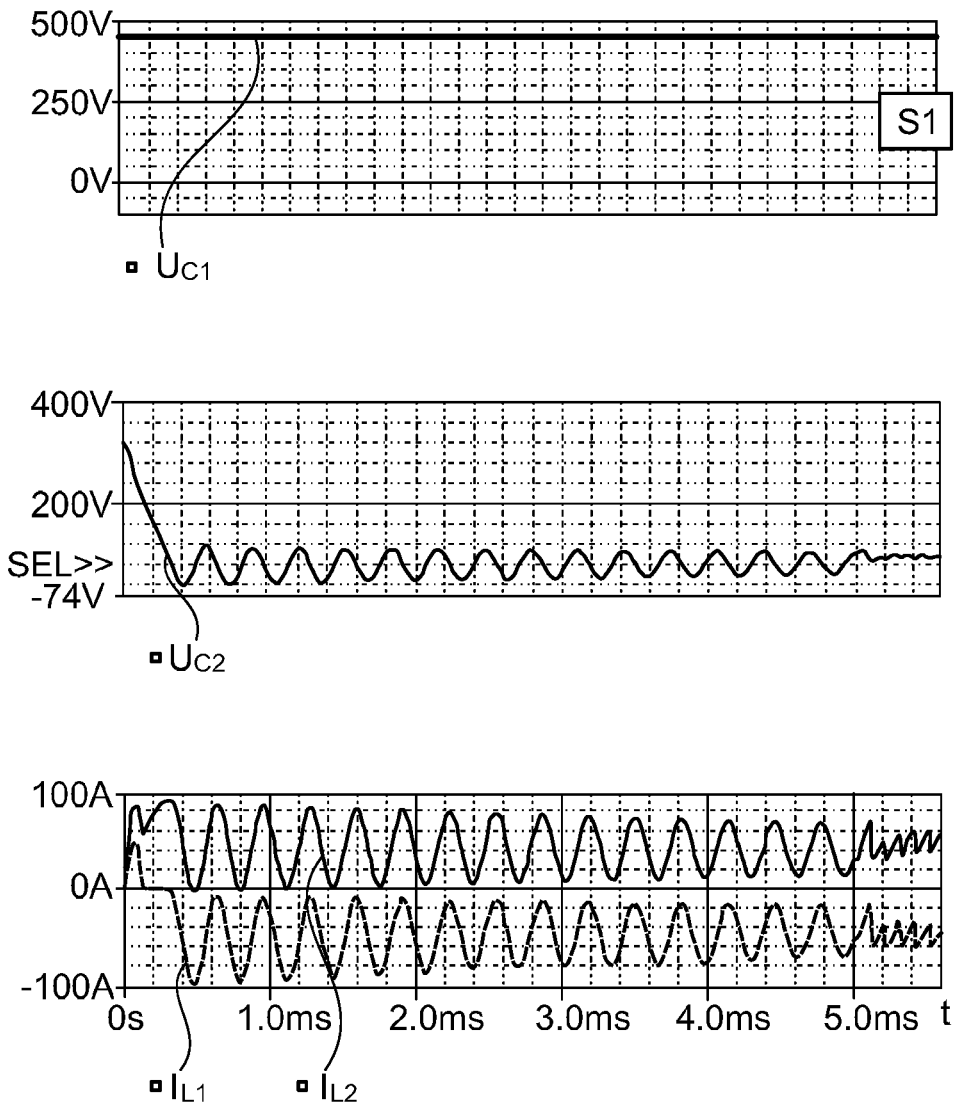
FIG. 2: shows electrical parameters of a first step for powering down an intermediate circuit voltage of the electrical supply network.
Figure 3:
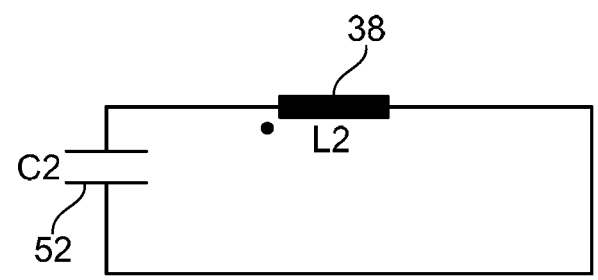
FIG. 3: shows an equivalent circuit diagram for this first step.

FIG. 2 shows the electrical parameters $U_{C1}$, $U_{C2}$, $I_{L1}$ and $I_{L2}$ of a step 1 (S1) for powering down the intermediate circuit voltage of the electrical supply network 18 in corresponding representations, in which the voltages $U_{C1}$, $U_{C2}$ at the capacitors 50, 52 and the currents $I_{L1}$ and $I_{L2}$ through the inductances 36, 38 are plotted over time t. In this step 1, the input capacitor 52 at the input 20 of the voltage transformer 22 is discharged via one of the inductances (referred to as L2), namely the inductance 38 of the second voltage transformer unit 34. For this purpose, the second semiconductor switch unit 46 of the second voltage transformer unit 34 is closed when the semiconductor switch units 40, 42 of the first voltage transformer unit 32 are open. The result is the equivalent circuit diagram for this step 1 (S1) shown in FIG. 3. This step 1 takes less than 6 ms in the example shown.

In other words, in step 1, the energy stored in C2 is shorted and discharged via the inductance L2.

Figure 4:
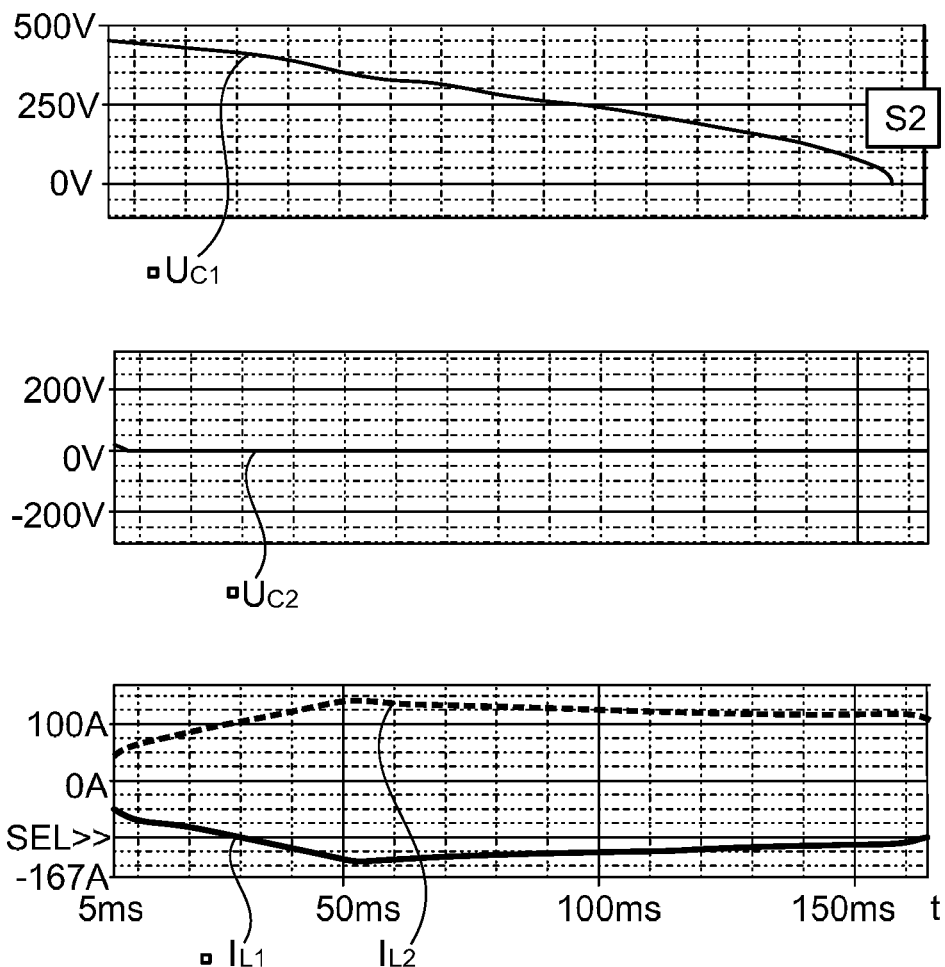
FIG. 4: shows electrical parameters of a second step for powering down an intermediate circuit voltage of the electrical supply network.
Figure 5:
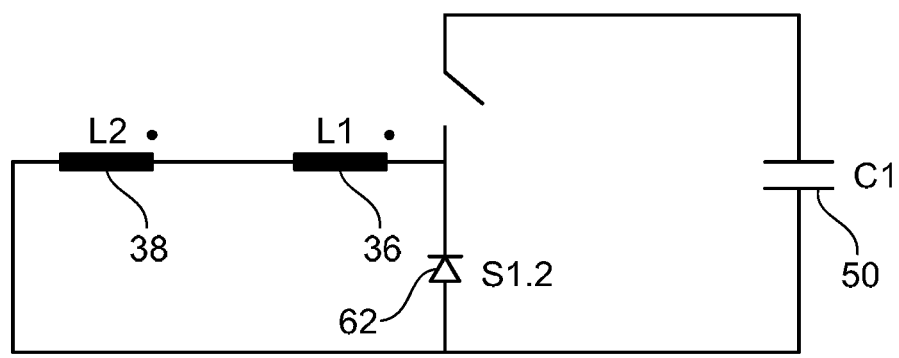
FIG. 5: shows an equivalent circuit diagram for this second step.

FIG. 4 shows the electrical parameters $U_{C1}$, $U_{C2}$, $I_{L1}$ and $I_{L2}$ of a step 2 (S2) for powering down the intermediate circuit voltage of the electrical supply network 18 in corresponding representations, in which the voltages $U_{C1}$, $U_{C2}$ at the capacitors 50, 52 and the currents $I_{L1}$ and $I_{L2}$ through the inductances 36, 38 are plotted over time t. In doing so, the energy stored in the intermediate circuit 28 is distributed to both inductances 36, 38. For this purpose, by the clocked switching on and off of the first semiconductor switch unit 40 (S1.1) of the first voltage transformer unit (32) with the second semiconductor switch unit 46 (S2.2) of the second voltage transformer units 34 still closed, the energy stored in the intermediate circuit 28 is distributed to both inductances 36, 38 (L1, L2). The result is the equivalent circuit diagram for this step 2 (S2) shown in FIG. 5. This step 2 takes less than 170 ms in the example shown.

In other words, the low-side switch unit 46 remains constantly switched on. The high-side switch unit 40 is clocked by a PWM (PWM: pulse width modulation) controlled control unit (10 kHz). Clocking is used to limit the current. In the switched-on state, the energy from the capacitor C1 is distributed to the inductances 36, 38 (L1, L2). In the switched-off state, the inductances 36, 38 (L1, L2) are slightly discharged again via the diode 62 of the low-side switch unit S2.2. Vibration resonances and saturation of the inductances 36, 38 (L1, L2) are prevented by regulating the PWM ratios. On average, the energy of the capacitor 50 (C1) is stored by the inductances L1 and L2. This state is maintained until the energy stored in C1 is depleted.

Figure 6:
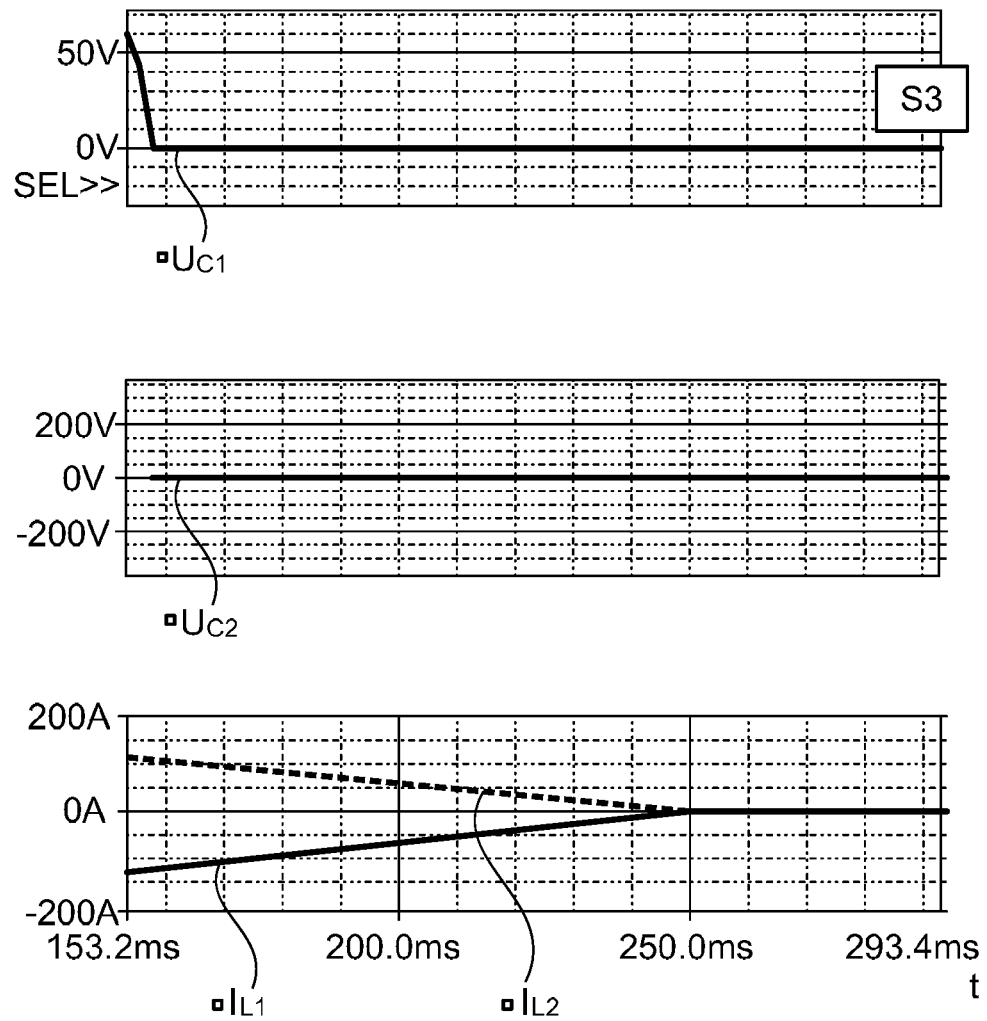
FIG. 6: shows electrical parameters of a third step for powering down an intermediate circuit voltage of the electrical supply network.
Figure 7:
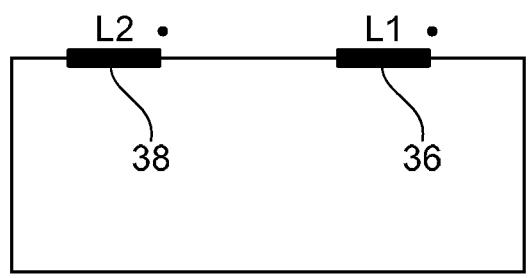
FIG. 7: shows an equivalent circuit diagram for this third step.

FIG. 6 shows the electrical parameters $U_{C1}$, $U_{C2}$, $I_{L1}$ and $I_{L2}$ of a step 3 (S3) for powering down the intermediate circuit voltage of the electrical supply network 18 in corresponding representations, in which the voltages $U_{C1}$, $U_{C2}$ at the capacitors 50, 52 and the currents $I_{L1}$ and $I_{L2}$ through the inductances 36, 38 are plotted over time t. In this case, the energy stored in the inductances 36, 38 is dissipated via internal resistors (not explicitly shown) of the circuit arrangement 30. For this purpose, both semiconductor switch units 40, 42 of the first voltage transformer unit 32 are opened with the second semiconductor switch unit 46 of the second voltage transformer unit 4 still closed. The result is the equivalent circuit diagram for this step 3 (S3) shown in FIG. 6. This step 3 takes about 100 ms in the example shown.

In other words, the low-side switch unit S2.2 of the second voltage transformer unit 34 remains switched on and both switch units 40, 42 (S1.1 and S1.2) are switched off. The energy from the inductances 36, 38 (L1 and L2) is discharged through the internal resistors of the circuit arrangement 30.

Figure 8:
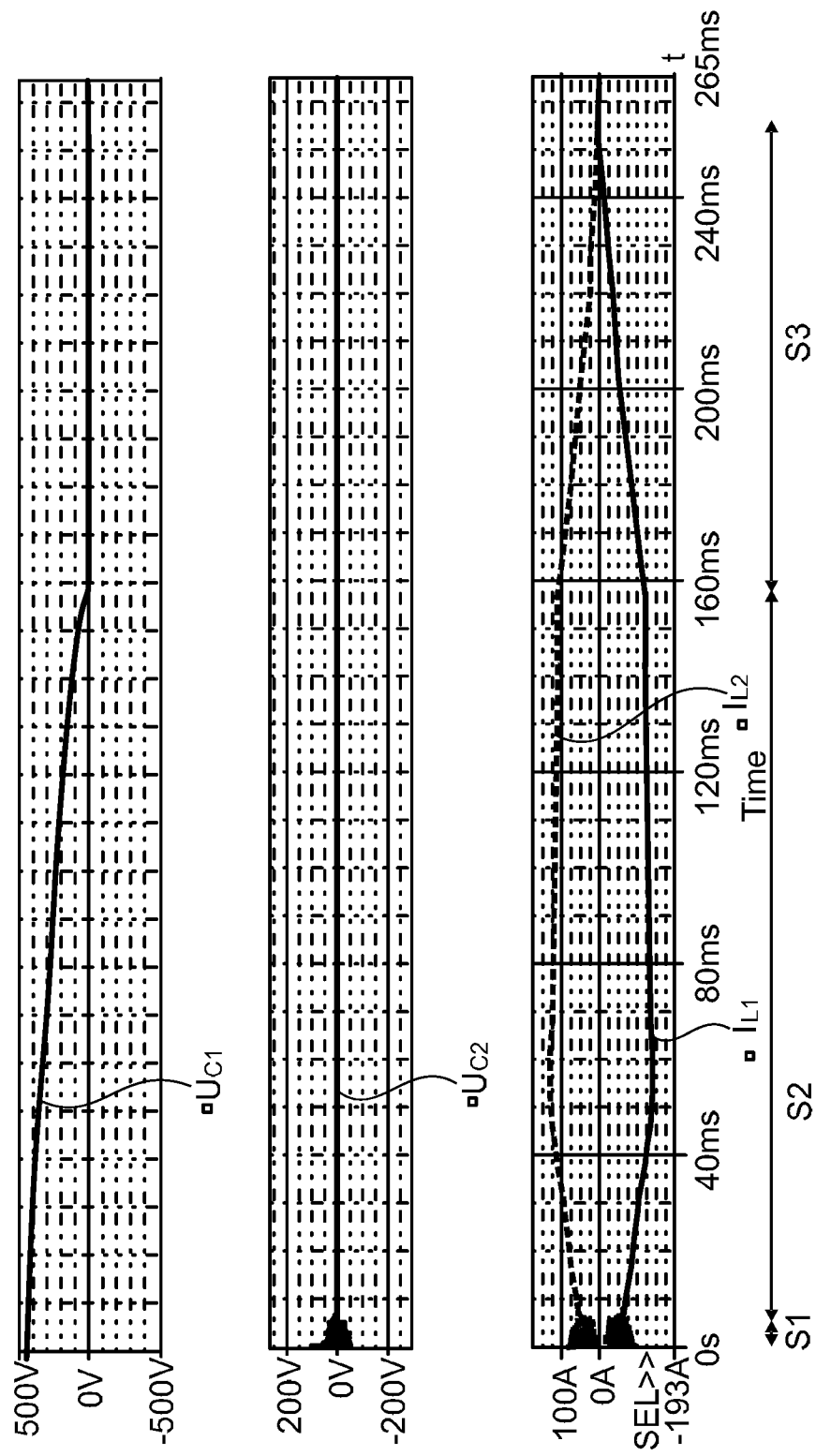
FIG. 8: shows the electrical parameters of all three steps.

Finally, FIG. 8 shows the electrical parameters $U_{C1}$, $U_{C2}$, $I_{L1}$ and $I_{L2}$ of all three steps S1-S3. Here, too, the voltages $U_{C1}$, $U_{C2}$ at the capacitors 50, 52 and the currents $I_{L1}$ and $I_{L2}$ through the inductances 36, 38 are plotted over the time t. In the example shown here, the entire discharge process takes approx. 250 ms.

The disclosure relates to a novel method for actively discharging the (DC) intermediate circuit 28 of power electronics in drive systems with an upstream multiphase DC/DC converter 22 in buck-boost or boost topology. This can be used for any electric vehicle drive for hybrid electric, plug-in hybrid, pure electric or fuel cell vehicles. It is particularly suitable for the latter, because in this case a multiphase DC/DC converter 22 is always required to adapt the fuel cell voltages to the intermediate traction circuit.

LIST OF REFERENCE SYMBOLS

10 Energy supply system
12 Electrical machine
14 Electrical traction machine
16 Electrical energy storage system
18 Electrical supply network
20 Input (supply network)
22 Multiphase voltage transformer
24 Output (supply network)
26 Output current converter 28 Intermediate circuit
30 Circuit arrangement
32 Voltage transformer unit
34 Voltage transformer unit
36 Inductance
38 Inductance
40 Semiconductor switch unit
42 Semiconductor switch unit
44 Semiconductor switch unit
46 Semiconductor switch unit
48 Control unit
50 Intermediate circuit capacitor
52 Input capacitor
54 Inverter
56 Semiconductor switch unit
58 Semiconductor switch unit
60 Power transistor
62 Power diode
U, V, W phases
S1: Step 1
S2: Step 2
S3: Step 3

The invention claimed is:

1. A multiphase voltage transformer for an electrical supply network for supplying an electrical machine with electrical energy from an electrical energy storage system, the electrical supply network comprises the multiphase voltage transformer, an output current converter connected downstream of the multiphase voltage transformer and an intermediate circuit connected between the multiphase voltage transformer and the output current converter, the multiphase voltage transformer comprising:
   a circuit arrangement having a plurality of parallel-connected voltage transformer units at an input end, each of said transformer units having an inductance and two semiconductor switches, and a controller for actuating the semiconductor switches,
   the controller being configured to actuate the semiconductor switches units in an intermediate circuit discharging operation such that the intermediate circuit voltage of the intermediate circuit is powered down in less than two seconds into a voltage range lower than 60 V DC.

2. The voltage transformer according to claim 1, wherein the controller is configured to actuate the semiconductor switches in the intermediate circuit discharging operation such that (a) initially an input capacitor at an input of the voltage transformer is discharged via at least one of the inductances, then (b) energy stored in the intermediate circuit is distributed to the inductances, and (c) energy stored in the inductances is dissipated via internal resistors of the circuit arrangement.

3. The voltage transformer according to claim 1, wherein the voltage transformer units are parallel-connected at input ends thereof via respective ones of the inductances thereof, each said voltage transformer unit is connected to a voltage potential of the intermediate circuit via respective first ones of the semiconductor switches and is connected to a base potential of the intermediate circuit via respective second ones of the semiconductor switches, and the voltage potential of the intermediate circuit voltage is defined in relation to the base potential.

4. The voltage transformer according to claim 3, wherein the controller is configured to carry out the following steps in the intermediate circuit discharging operation:
   closing the second semiconductor switch of a second one of the voltage transformer units when the semiconductor switches of a first one of the voltage transformer units are open in order to discharge an input capacitor via the inductance of the second voltage transformer unit,
   subsequent clocked switching on and off of the first semiconductor switch of the first voltage transformer unit with the second semiconductor switch of the second voltage transformer unit still closed in order to distribute energy stored in the intermediate circuit to the inductances, and finally
   opening both of the semiconductor switches of the first voltage transformer unit with the second semiconductor switch of the second voltage transformer unit still closed to dissipate energy stored in the inductances via internal resistors of the circuit arrangement.

5. An electrical supply network for supplying an electrical machine with electrical energy from an electrical energy storage system, the electrical supply network comprising the multiphase voltage transformer according to claim 1, an output current converter connected downstream of the multiphase voltage transformer, and an intermediate circuit connected between the multiphase voltage transformer and the output current converter.

6. The electrical supply network according to claim 5, wherein the output current converter comprises an inverter.

7. An energy supply system with an electrical machine, an electrical energy storage system and the electrical supply network according to claim 5 connected between the electrical machine and the electrical energy storage system.

8. An electrical supply network for supplying an electrical traction machine of a vehicle with electrical energy from an electrical energy storage system, the electrical supply network comprising the multiphase voltage transformer according to claim 1, an output current converter connected downstream of the multiphase voltage transformer, and an intermediate circuit connected between the multiphase voltage transformer and the output current converter.

9. The electrical supply network according to claim 8, wherein the output current converter comprises an inverter.

10. An energy supply system with an electrical traction machine of a vehicle, an electrical energy storage system and the electrical supply network according to claim 8 connected between the electrical machine and the electrical energy storage system.

11. A method for powering down an intermediate circuit voltage of an electrical supply network for supplying an electrical machine, comprising:
   providing a multiphase voltage transformer, an output current converter connected downstream of the multiphase voltage transformer and an intermediate circuit connected between the multiphase voltage transformer and the output current converter, wherein the multiphase voltage transformer comprises a circuit arrangement having a plurality of parallel-connected voltage transformer units at an input end, each of the voltage transformer units having an inductance and two semiconductor switches units, and a controller for actuating the semiconductor switches,
   the controller actuating the semiconductor switches in an intermediate circuit discharging operation to power down the intermediate circuit voltage of the intermediate circuit in less than two seconds to a voltage range lower than 60 V DC.

12. The method according to claim 11, further comprising the controller actuating the semiconductor switches units in the intermediate circuit discharging operation such that (a) initially discharging an input capacitor at an input of the voltage transformer via at least one of the inductances, then
(b) distributing energy stored in the intermediate circuit to the inductances, and
(c) dissipating energy stored in the inductances via internal resistors of the circuit arrangement.

13. A computer program product comprising program steps stored in a non-volatile memory that are configured to be loaded into a processor of the controller of the multiphase voltage transformer to carry out the method according to claim 11.

14. A multiphase voltage transformer for an electrical supply network for supplying an electrical traction machine of a vehicle with electrical energy from an electrical energy storage system, the electrical supply network comprises the multiphase voltage transformer, an output current converter connected downstream of the multiphase voltage transformer and an intermediate circuit connected between the multiphase voltage transformer and the output current converter, the multiphase voltage transformer comprising:
a circuit arrangement having a plurality of parallel-connected voltage transformer units at an input end, each of said transformer units having an inductance and two semiconductor switches, and a controller for actuating the semiconductor switches,
the controller being configured to actuate the semiconductor switches units in an intermediate circuit discharging operation such that the intermediate circuit voltage of the intermediate circuit is powered down in less than two seconds into a voltage range lower than 60 V DC; and
wherein the controller is configured to actuate the semiconductor switches in the intermediate circuit discharging operation such that (a) energy stored in the intermediate circuit is distributed to the inductances, and (b) energy stored in the inductances is dissipated via internal resistors of the circuit arrangement.

15. The voltage transformer according to claim 14, wherein the controller is configured to initially discharge an input capacitor at an input of the voltage transformer via at least one of the inductances.

16. The voltage transformer according to claim 15, wherein the voltage transformers are parallel-connected at the inputs thereof via respective ones of the inductances thereof, each said voltage transformer unit is connected to a voltage potential of the intermediate circuit via respective first ones of the semiconductor switches and is connected to a base potential of the intermediate circuit via respective second ones of the semiconductor switches, and the voltage potential of the intermediate circuit voltage is defined in relation to the base potential.

17. The voltage transformer according to claim 16, wherein the controller is configured to carry out the following steps in the intermediate circuit discharging operation:
closing the second semiconductor switch of a second one of the voltage transformer units when the semiconductor switches of a first one of the voltage transformer units are open in order to discharge an input capacitor via the inductance of the second voltage transformer unit,
subsequent clocked switching on and off of the first semiconductor switch of the first voltage transformer unit with the second semiconductor switch of the second voltage transformer unit still closed in order to distribute energy stored in the intermediate circuit to the inductances, and finally
opening both of the semiconductor switches of the first voltage transformer unit with the second semiconductor switch of the second voltage transformer unit still closed to dissipate energy stored in the inductances via internal resistors of the circuit arrangement.

* * * * *